P. M. RAINEY.
TELEGRAPH SYSTEM.
APPLICATION FILED NOV. 15, 1917.
1,292,049.
Patented Jan. 21, 1919.
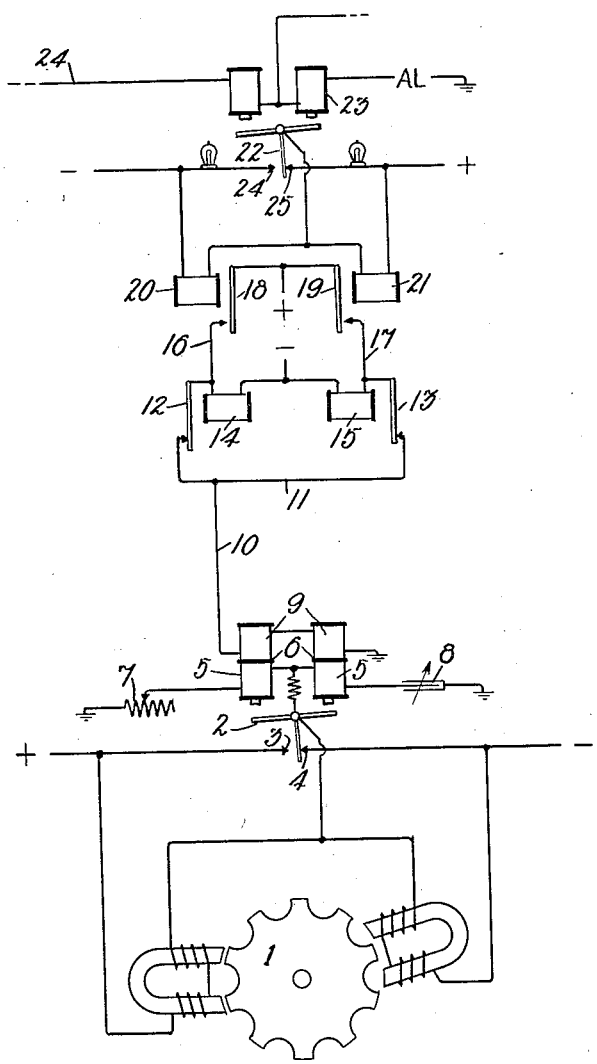
Inventor:
Paul M. Rainey.
by J. E. Roberts Att'y.

UNITED STATES PATENT OFFICE.

PAUL M. RAINEY, OF GLEN RIDGE, NEW JERSEY, ASSIGNOR TO WESTERN ELECTRIC COMPANY, INCORPORATED, OF NEW YORK, N. Y., A CORPORATION OF NEW YORK.

TELEGRAPH SYSTEM.

1,292,049.  Specification of Letters Patent.  Patented Jan. 21, 1919.

Application filed November 15, 1917. Serial No. 202,102.

*To all whom it may concern:*

Be it known that I, PAUL M. RAINEY, a citizen of the United States, residing at Glen Ridge, in the county of Essex and State of New Jersey, have invented certain new and useful Improvements in Telegraph Systems, of which the following is a full, clear, concise, and exact description.

This invention relates to telegraph systems, and its object is to control the speed of operation of a mechanism at one end of the line by means of the line impulses.

To this end the invention provides a motor, the application of power to which is controlled by a vibrating device such, for example, as the well-known Gulstadt relay, the armature of which controls contacts in the circuit of the power source, and in this manner energizes the motor. The rate of vibration of the armature of the relay is adjusted in a well-known manner to correspond to the normal rate of transmission of the line impulses. The main coil of the vibrating relay is connected to a circuit including a plurality of relays and a source of power.

The application of power to said relays is controlled by the vibration of an armature tongue of the line relay in response to impulses of line current. As a result of this, there is imposed on the windings of the vibrating relay, an additional short impulse of current at each impulse of line current, which, when the vibrating relay is out of step with the line relay, tends either to accelerate or retard its vibration and thereby keep it and the motor it controls in synchronism with the rate of transmission of the line impulses.

As illustrated in the figure, the device comprises a motor or phonic wheel 1 connected to a suitable source of current. The application of current to the motor 1 is controlled by the vibration of armature tongue 2 of a Gulstadt relay between two contacts 3 and 4 in the circuit of the source of current and the phonic wheel 1. The armature tongue 2 is connected to the windings of the phonic wheel 1 and to the auxiliary coil 5, thence to resistance 7 and capacity 8, by which the rate of vibration of the armature is adjusted.

The main coil 9 of relay 6 is connected by wire 10 to wire 11, leading to armatures 12 and 13 of relays 14 and 15. These relays 14 and 15 are connected to the negative pole of a current source and to wires 16 and 17, leading to armatures 18 and 19 of relays 20 and 21. Armatures 12 and 13 are also respectively connected to wires 16 and 17. The armatures 18 and 19 are connected to the positive pole of a current source. Relay 20 is connected at one end to the negative pole of a source of current, and relay 21 at one end to the positive pole of a source of current. The other ends of relays 20 and 21 are connected to the armature tongue 22 of line relay 23. The armature tongue 22 moves in response to impulses of line current between contacts 24 and 25, and by so doing energizes one or the other of relays 20 and 21. The line relay 23 receives current impulses from the line 24 and means are shown for adapting it for duplex working.

The operation of the device is as follows:

Assuming a normal rate of transmission of line impulses, the capacity 8 and resistance 7 in circuit with the auxiliary coil 5 of the vibrating relays 6 are so adjusted that the armature 2 thereof will vibrate at a rate substantially equal thereto. In consequence, the rotation of the phonic wheel takes place in synchronism with the rate of transmission of the line impulses. As the armature tongue 22 vibrates in response to the line impulses received over line 24, it alternately energizes relays 20 and 21 and sends a short impulse through the main coil 9 of vibrating relay 6, in the following manner:

If we assume armature tongue 22 making contact with 24, current will flow from the negative pole of the source of current to the armature tongue 22, thence to relay 21 to the positive pole of the source of current. Relay 21 pulls up armature 19, causing current to flow from the positive pole of the current source through armature 19, wire 17, relay 15, to the negative pole of the current source. Relay 15 pulls up armature 13, but before armature 13 breaks its contact a short impulse of current has traversed armature 13, wire 11, wire 10 and main coil 9 of relay 6 to impose upon the windings of relay 6 an additional impulse of current. When armature tongue 22 of the line relay makes contact with 25, a similar action takes place by the energization of relays 20 and 14. It is clear, therefore, that at each impulse of line current, an impulse of uni-directional current is imposed upon the main windings of vibrating relay 6. If the armatures of the line relay and vibrating relay are in exact synchronism, the additional pulse of current imposed upon relay 6 will merely augment the effect of the current in the auxiliary winding 5, but if the two armatures are slightly out of phase, the short pulse of current through the main winding 9 will tend either to accelerate or retard the motion of armature 2 and consequently, will either accelerate or retard the motion of the motor or phonic wheel 1. By this means, therefore, the phonic wheel is controlled and kept in synchronism by the line currents themselves.

What is claimed is:

1. In combination, a motor, a line, a relay in said line responsive to line current impulses, a source of current for said motor, a vibrating member controlling the application of current to said motor, electromagnetic means independent of the line impulses for driving said vibrating member normally at a rate corresponding to the rate of transmission of line impulses, and means controlled by the line relay for magnetically regulating said driving means.

2. In combination, a motor, a line, a relay in said line responsive to line current impulses, a source of current for said motor, a vibrating relay controlling the application of current to said motor, electromagnetic means independent of the line impulses for driving said vibrating relay normally at a rate corresponding to the rate of transmission of line impulses, and means controlled by the line relay for magnetically regulating the vibrating relay.

3. In combination, a motor, a line, a relay in said line responsive to line current impulses, a vibrating relay controlling the application of current to said motor, means for adjusting the rate of vibration of said vibrating relay to correspond to the normal rate of transmission of impulses on the line, and means controlled by the line impulses for applying an impulse of uni-directional current to the vibrating relay at each impulse of line current.

4. In combination, a motor, a line, a vibrating relay controlling the application of current to said motor, a source of current to drive said motor and said relay, a line relay responding to line current impulses, means for adjusting the rate of vibration of the vibrating relay to correspond to the normal actuation of the line relay, and a plurality of relays in a local circuit controlled by said line relay, said plurality of relays adapted to cause the application of a short impulse of uni-directional current to said vibrating relay at each impulse of current in the line.

5. In combination, a motor, a line, a relay in said line responsive to line current impulses, a vibrating relay controlling the application of current to said motor, means for adjusting the rate of vibration of said relay to correspond to the normal rate of transmission of impulses on the line, and means controlled by the line impulses for applying to the vibrating relay a correcting impulse of current at each impulse of line current.

In witness whereof, I hereunto subscribe my name this 13th day of November, A. D. 1917.

PAUL M. RAINEY.